(12) United States Patent
Capela et al.

(10) Patent No.: US 11,644,066 B2
(45) Date of Patent: May 9, 2023

(54) COUPLING DEVICE BETWEEN TWO COAXIAL SHAFTS, IN PARTICULAR FOR A STEERING COLUMN OF A MOTOR VEHICLE

(71) Applicant: Robert Bosch Automotive Steering Vendome SAS, Vendome (FR)

(72) Inventors: David Capela, Busloup (FR); Remy Cluzel, Merignac (FR); Laurent Fevre, Saint Sulpice (FR)

(73) Assignee: ROBERT BOSCH AUTOMOTIVE STEERING VENDOME SAS, Vendome (FR)

( * ) Notice: Subject to any disclaimer, the term of this patent is extended or adjusted under 35 U.S.C. 154(b) by 626 days.

(21) Appl. No.: 16/692,926

(22) Filed: Nov. 22, 2019

(65) Prior Publication Data
US 2020/0182304 A1    Jun. 11, 2020

(30) Foreign Application Priority Data

Nov. 23, 2018    (FR) ...................................... 1871752

(51) Int. Cl.
| | |
|---|---|
| *B62D 1/185* | (2006.01) |
| *F16D 3/227* | (2006.01) |
| *B62D 7/16* | (2006.01) |
| *F16C 29/04* | (2006.01) |
| *F16C 3/035* | (2006.01) |

(52) U.S. Cl.
CPC ............ *F16D 3/227* (2013.01); *B62D 1/185* (2013.01); *B62D 7/163* (2013.01); *F16C 29/04* (2013.01); *F16C 3/035* (2013.01)

(58) Field of Classification Search
CPC ......... B62D 1/185; F16D 3/227; F16C 29/04; F16C 3/035
See application file for complete search history.

(56) References Cited

U.S. PATENT DOCUMENTS

| | | | |
|---|---|---|---|
| 5,209,315 A | 5/1993 | Schlagmueller et al. | |
| 6,343,993 B1* | 2/2002 | Duval | F16C 3/035 384/49 |
| 7,041,022 B2 | 5/2006 | Bock et al. | |
| 7,322,607 B2* | 1/2008 | Yamada | F16C 33/58 280/755 |
| 7,338,078 B2* | 3/2008 | Yamada | F16C 29/007 280/775 |

(Continued)

FOREIGN PATENT DOCUMENTS

| | | |
|---|---|---|
| EP | 1065397 A1 | 1/2001 |
| WO | WO-2007/017016 A1 | 2/2007 |

*Primary Examiner* — Barry Gooden, Jr.
(74) *Attorney, Agent, or Firm* — Harness Dickey & Pierce, PLC (57) ABSTRACT

A coupling device includes two coaxial shafts, namely a tubular outer shaft and an inner shaft, capable of rotating about a reference axis; a wrap-around raceway formed on a first one of the coaxial shafts; an oblique raceway formed on the second coaxial shaft and a play take-up rail provided with a complementary raceway and movable relative to the second coaxial shaft parallel to a plane perpendicular to the reference axis. A row of balls is positioned to run parallel to the reference axis on the wrap-around raceway, the oblique raceway and the complementary raceway, to guide the two coaxial shafts relative to each other in translation.

20 Claims, 8 Drawing Sheets

(56) References Cited

U.S. PATENT DOCUMENTS

| | | | | |
|---|---|---|---|---|
| 7,404,768 B2* | 7/2008 | Yamada | ............ | F16D 3/065 |
| | | | | 384/54 |
| 7,416,199 B2* | 8/2008 | Yamada | ............ | F16C 3/035 |
| | | | | 74/552 |
| 7,416,216 B2* | 8/2008 | Shoda | ............ | F16C 29/123 |
| | | | | 280/775 |
| 7,481,130 B2* | 1/2009 | Yamada | ............ | B62D 1/185 |
| | | | | 280/775 |
| 7,526,978 B2* | 5/2009 | Bahr | ............ | F16C 27/04 |
| | | | | 464/167 |
| 7,753,800 B2* | 7/2010 | Tokioka | ............ | F16D 3/065 |
| | | | | 384/54 |
| 8,398,496 B2* | 3/2013 | Bahr | ............ | B62D 1/16 |
| | | | | 464/167 |
| 8,678,939 B2* | 3/2014 | Fevre | ............ | F16C 29/123 |
| | | | | 384/54 |
| 2001/0006564 A1* | 7/2001 | Geyer | ............ | F16C 29/123 |
| | | | | 384/49 |
| 2006/0053934 A1* | 3/2006 | Bahr | ............ | F16C 29/04 |
| | | | | 74/492 |
| 2011/0098121 A1* | 4/2011 | Bahr | ............ | F16C 29/123 |
| | | | | 464/167 |
| 2013/0079165 A1* | 3/2013 | Fevre | ............ | F16D 3/065 |
| | | | | 464/167 |
| 2018/0370563 A1 | 12/2018 | Schaenzel et al. | | |

* cited by examiner

COUPLING DEVICE BETWEEN TWO COAXIAL SHAFTS, IN PARTICULAR FOR A STEERING COLUMN OF A MOTOR VEHICLE

CROSS-REFERENCE TO RELATED APPLICATIONS

This application claims priority to French Patent Application Serial No. FR 1871752, filed on Nov. 23, 2018, which is incorporated by reference herein.

FIELD

The invention relates to a coupling device comprising two coaxial shafts having a degree of freedom of translation with respect to each other parallel to their common axis, while being fixed to each other in rotation about their common axis. It also relates to a motor vehicle steering column incorporating such a coupling device.

BACKGROUND

There are many known examples of coupling devices with two coaxial shafts having a degree of freedom of translation with respect to each other parallel to their common axis, while being fixed to each other in rotation about their common axis. According to a known architecture, and illustrated for example in document EP1065397, a wrap-around raceway extending parallel to the reference axis is formed on one of the two coaxial shafts, the other of the two coaxial shafts being equipped with two fixed rails in translation but movable relative to the second shaft parallel to a plane perpendicular to the reference axis, and each comprising a complementary raceway, the complementary raceways being located at a distance and facing each other on either side of a reference plane passing through the shaft axis. A row of balls is positioned to run parallel to the reference axis on the wrap-around raceway and the complementary raceways, in order to guide the two coaxial shafts with respect to each other in translation parallel to the reference axis. The balls in the row of balls each have a ball centre positioned in the reference plane. The rails are loaded by elastic means, each in a direction of support against the row of balls, parallel to a transverse plane perpendicular to the reference axis such that in the absence of torsional loading about the reference axis between the two coaxial shafts, the wrap-around raceway and the two complementary raceways apply to the balls of the row of balls support forces having components in the transverse plane that are in balance. This allows the play to be taken-up between the raceways and the balls, such that the two coaxial shafts are fixed to each other in rotation around the reference axis.

Document WO07017016 describes a coupling for torque transmission, comprising two coaxial shafts each provided with raceways on which rolling bodies roll to ensure the relative sliding of the two shafts, and provided with two opposite freewheel mechanisms, preventing the relative rotation of the two shafts about their axis. The two freewheels are formed by two rows of balls held apart in the circumferential direction against the walls of the two shafts by spacer springs. Although the balls of both freewheel mechanisms are assumed to run unimpeded in the axial direction in the absence of torsion torque, in practice the device is unsatisfactory because it is likely to get stuck when trying to slide the two coaxial shafts into each other. In addition, the device requires many parts, since it requires two rows of balls.

SUMMARY

The invention aims to overcome the disadvantages of the state of the art and to provide a coupling device for torque transmission with a simplified and compact structure.

To this end, according to a first aspect of the invention, a coupling device is proposed comprising two coaxial shafts capable of rotating about a reference axis of the coupling device, the two coaxial shafts consisting of a tubular outer shaft and an inner shaft; the coupling device also comprising a ball guide with play take-up, comprising:
- a wrap-around raceway extending parallel to the reference axis and formed on a first of the two coaxial shafts, the wrap-around raceway being formed on either side of a reference plane of the coupling device, the reference plane containing the reference axis;
- an oblique raceway formed on the second of the two coaxial shafts and extending parallel to the reference axis;
- a play take-up rail, the play take-up rail being fixed in translation parallel to the reference axis with respect to a second of the two coaxial shafts and movable with respect to the second of the two coaxial shafts parallel to a plane perpendicular to the reference axis, and comprising a complementary raceway, the oblique raceway and the complementary raceway being located on either side of the reference plane and turned towards the reference plane,
- a row of balls positioned to run parallel to the reference axis on the wrap-around raceway, the oblique raceway and the complementary raceway, to guide the two coaxial shafts relative to each other in translation parallel to the reference axis, the balls of the row of balls each having a ball centre positioned along an alignment axis parallel to the reference axis and located in the reference plane;

By using only one play take-up rail opposite an oblique raceway formed directly on the second of the two shafts, the symmetry of the devices of the prior art state is freed, thus simplifying and compacting the play take-up mechanism.

Preferably, the play take-up rail is in contact with a contact surface of the second of the two coaxial shafts. Preferably, the contact surface of the second of the two coaxial shafts has, in cross-section in any cutting plane perpendicular to the reference axis, a single effective contact area with the play take-up rail. The contact surface can be arranged to allow a translational sliding of the play take-up rail on the contact surface to achieve the desired play take-up. In this case, the contact surface should preferably face the reference plane, and preferably have a profile in cross-section in the transverse plane that approaches an axis of alignment of the ball centres away from the elastic member. Thus, by means of the elastic member, the play take-up rail can be loaded in a direction that effectively cancels out the play between the balls and the raceways.

Alternatively, the support surface can be arranged to allow the play take-up rail to pivot about an axis of rotation, or an instantaneous axis of rotation, parallel to the reference axis. In this case, the support surface is shaped with a concavity or convexity complementary to a corresponding contact area of the play take-up rail.

Following a preferred embodiment, the contact surface of the second of the two coaxial shafts has, in cross-section in a cutting plane perpendicular to the reference axis, a concave profile, preferably an arcuate profile with a centre of curvature that is not at the same distance from the reference axis as the axis of alignment of the ball centres and is preferably located in the reference plane. The displacement of the play take-up rail on the contact surface thus allows the additional raceway to be positioned in such a way as to obtain a clearance-free contact between the balls of the raceway and the wrap-around raceway, the inclined raceway and the additional raceway.

In a particularly advantageous embodiment, at least one elastic element loads the play take-up rail in a direction of support against the row of balls, parallel to a transverse plane perpendicular to the reference axis so that in the absence of torque exerted about the reference axis between the two coaxial shafts, the wrap-around raceway, the oblique raceway and the complementary raceway apply to the balls of the row of balls supporting forces having components in the transverse plane that balance each other and that the two coaxial shafts are fixed to each other in rotation about the reference axis. In a first variant, the elastic member rests against a support surface of the second of the two coaxial shafts. The elastic member contributes to the pinching of the balls in the row of balls. According to one embodiment, the support surface and the contact surface are facing each other. Preferably, the support surface is substantially parallel to a plane passing through the alignment axis and the contact area between the play take-up rail and the contact surface. A substantial part of the forces between the balls and the second of the coaxial shafts can thus be transmitted directly by the play take-up rail, without passing through the elastic member.

According to one embodiment, the oblique raceway has a concave profile, preferably in the form of an arc of a circle, in cross-section in a cutting plane perpendicular to the reference axis, preferably with a radius of curvature greater than the radius of the balls in the row of balls.

Following one embodiment, the wrap-around raceway has two separate areas of effective contact with each ball in the row of balls, preferably located on either side of the reference plane. To do this, it is possible, for example, to provide that the wrap-around raceway has, in cross-section in a plane of cross-section perpendicular to the reference axis, a pointed profile, comprising two sections in an arc of a circle facing the reference plane, preferably having a radius of curvature greater than the radius of the balls in the row of balls.

According to one embodiment, the additional raceway has two separate areas of effective contact with each ball in the row of balls. Preferably, the two separate effective contact areas are located on either side of a plane passing through the ball centres of the row of balls and intersecting a single effective contact area between the play take-up rail and the contact surface of the second of the two coaxial shafts. In a particularly simple embodiment, the additional raceway has a concave profile, preferably in the form of an arc of a circle, in cross-section in a cutting plane perpendicular to the reference axis, preferably with a radius of curvature smaller than the radius of the balls in the row of balls.

Profiles in arcs of a circle have the advantage of being easy to manufacture and control.

In an alternative embodiment, it is possible to provide that the oblique raceway has two separate areas of effective contact, possibly reduced to two distant contact points, with each ball in the row of balls. In this case, it is advantageous to provide that the additional raceway formed on the play take-up rail has only one area of effective contact, if necessary punctual, with each ball in the row of balls. In particular, it will be possible to choose a complementary raceway with a concave transverse profile having a greater radius of curvature than the radius of the balls, or even a complementary raceway with a convex transverse profile.

According to one embodiment, the coupling device also has at least one additional guide, each additional guide having a first additional wrap-around raceway formed on the first of the two shafts, a second additional wrap-around raceway formed on the second of the two shafts, and a row of additional balls for running parallel to the reference axis on the first additional wrap-around raceway and the second additional raceway, each of the additional balls having two separate areas of effective contact with the first additional wrap-around raceway, and two separate areas of effective contact with the second additional wrap-around raceway. Thus, the one or more additional guides have no play take-up rail or elastic element.

According to one embodiment, the device further comprises at least one additional guide, each additional guide comprising a first wrap-around additional raceway formed on the first of the two shafts, a second oblique additional raceway formed on the second of the two shafts, a third additional raceway formed on a fixed additional rail with respect to the second of the two shafts, and a row of additional balls for running parallel to the reference axis on the first wrap-around additional raceway, the second oblique additional raceway, and the third additional raceway, each of the additional balls having two separate areas of effective contact with the first wrap-around additional raceway, at least one effective contact area with the second oblique additional raceway, and at least one effective contact area with the third additional raceway, and in that the play take-up rail is housed in a groove of the second of the two shafts, the groove having a given profile, the additional rail being housed in a further groove of the second of the two shafts having a profile identical to the profile of the groove. This arrangement simplifies the assembly, as the grooves are identical and it is not necessary to recognize a specific groove among others to carry out the assembly. The fixed additional rail thus has no other function than to reconstitute, from a groove shaped to accommodate the play take-up rail and the elastic member, a shape adapted to guide the additional balls.

According to one embodiment, at least one axial stop makes it possible to stop the play take-up rail axially with respect to the second of the two shafts, the axial stop preferably comprising at least one insert fixed to the second of the two shafts or the play take-up rail, or at least one shoulder formed on the second of the two shafts and able to come into contact with the play take-up rail.

In a manner known per se, the coupling device is preferably capable of operating in degraded mode, in the event that the balls escape. For this purpose, the outer shaft is advantageously provided with at least a first stop arranged opposite and at a distance from a first counterstop of the inner shaft, the first stop and the first counterstop being able to contact each other to secure the two coaxial shafts rotating in a first direction of rotation about the reference axis in the event of an escape of the balls of the row of balls, the outer shaft having at least a second stop arranged opposite and at a distance from a second counterstop of the inner shaft, the second stop and the second counterstop being capable of contacting to secure the two coaxial shafts rotating in a second direction of rotation about the reference axis in the event of an escape of the balls of the ball row.

The two coaxial shafts can be made of steel, the raceways and, if necessary, the tracks being formed by machining, with or without heat treatment. Alternatively, light materials, such as light metals or composite materials, can be chosen to form coaxial shafts. In this case, the raceways and, if necessary, the tracks can be reported to have the desired hardness.

According to one embodiment, the first of the two shafts is the tubular outer shaft.

Alternatively, the first of the two shafts is the inner shaft.

Another aspect of the invention relates to a steering column for a motor vehicle, comprising a coupling device as described above, a steering wheel connected in rotation to one of the two coaxial shafts and a transmission element integral with the other of the two coaxial shafts.

BRIEF DESCRIPTION OF THE FIGURES

The drawings described herein are for illustrative purposes only of selected embodiments and not all possible implementations, and are not intended to limit the scope of the present disclosure.

Further characteristics and advantages of the invention will be clear from reading the following description, made in reference to the appended figures, which show.

For greater clarity, identical or similar elements are identified by identical reference signs on all figures.

DETAILED DESCRIPTION OF THE EMBODIMENTS

Figure 1:
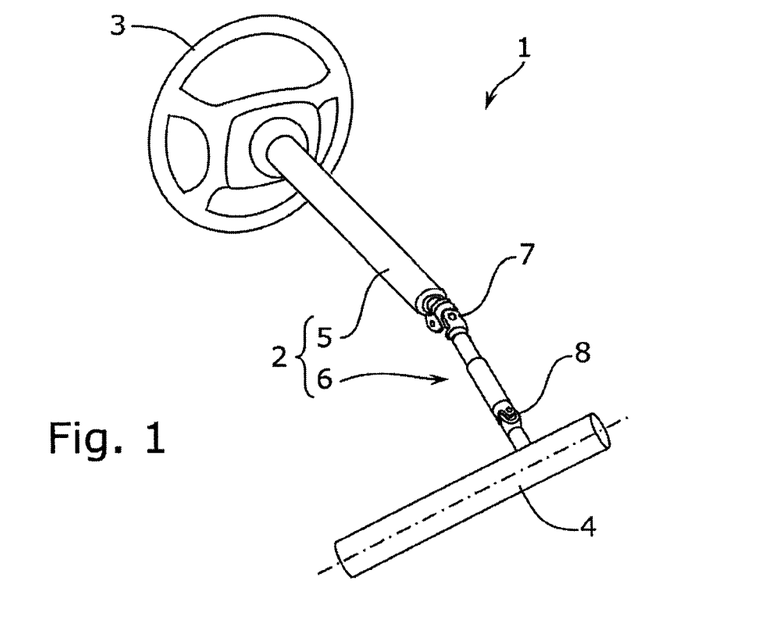
FIG. 1 is a schematic view of a steering mechanism of a motor vehicle.

FIG. 1 shows a motor vehicle steering mechanism 1, comprising a steering column 2 connecting a steering wheel 3 to a steering gear 4 to transmit an angular movement from the steering wheel 3 to the steering gear 4. The steering column 2 is divided into a column upper part 5, which the steering wheel 3 is attached to and an intermediate part 6, also called an intermediate axis, connected to the steering gear 4 and the column upper part 5 by universal joints 7, 8. The intermediate axis 6 allows the distance between the universal joints 7, 8 to be adjusted during assembly to facilitate the assembly of the steering gear 4, during vehicle operation to adapt to vehicle oscillations due to the road surface condition, and in the event of a frontal impact. It also allows torque to be transmitted in both directions of rotation around its axis.

Figure 2:
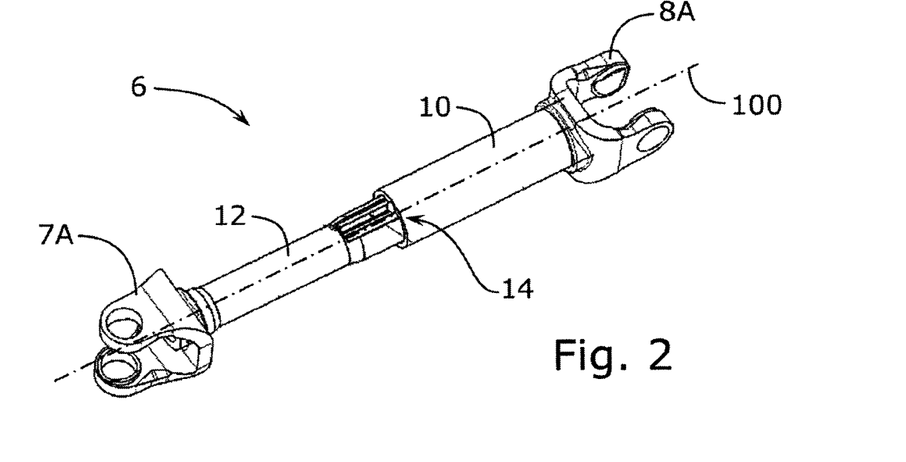
FIG. 2 is a view in perspective of a coupling device of the mechanism of FIG. 1, according to a first embodiment of the invention.
Figure 3:
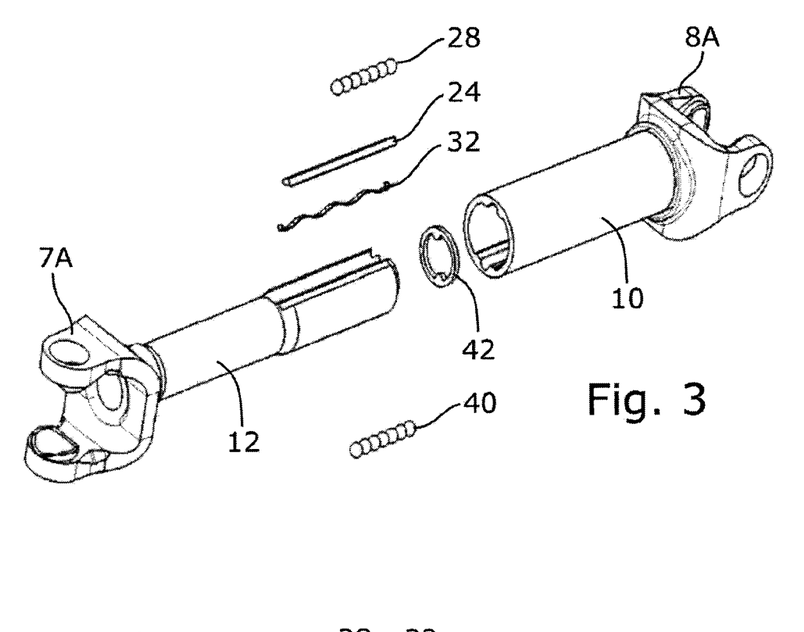
FIG. 3 is an exploded view of the coupling device of FIG. 2.

For this purpose, the intermediate axis 6 constitutes a coupling device, illustrated in detail in FIGS. 2 and 3, comprising two coaxial shafts, namely an outer tubular shaft 10 and an inner shaft 12 able to slide inside the outer shaft 10 parallel to a reference axis 100 of the coupling device 6, each of the shafts 10, 12 being provided at its free end with a universal joint jaw 7A, 8A.

Figure 4:
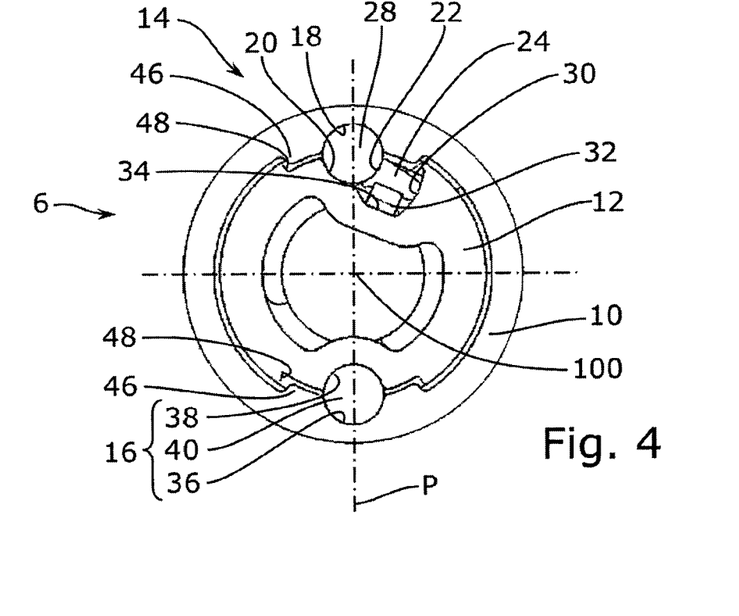
FIG. 4 is a cross-sectional view of the coupling device of FIG. 1, in a nominal operating position.

The relative sliding of the two coaxial shafts 10, 12 is achieved here by a single play take-up ball guide 14 and an additional 16 ball guide, located diametrically on either side of the common reference axis of the two shafts, as shown in FIG. 4. These two guides also have the function of transmitting the torque completely and without play around the reference axis 100.

The play take-up ball guide 14 has a wrap-around raceway 18 extending parallel to the reference axis 100 and formed on a first of the two coaxial shafts, in this case the outer shaft 10. It also includes an oblique raceway 20, which is formed on the second of the two coaxial shafts, here the inner shaft 12 and extends parallel to the reference axis 100, and an additional raceway 22, formed on a play take-up rail 24 housed in a groove 26 of the inner shaft 12. The wrap-around raceway 18, the oblique raceway 20 and the complementary raceway 22 together define a tubular cavity in which balls 28 are housed, forming a row of balls of the same diameter, the centres C of the balls 28 being aligned on an alignment axis parallel to the reference axis 100.

Figure 5:
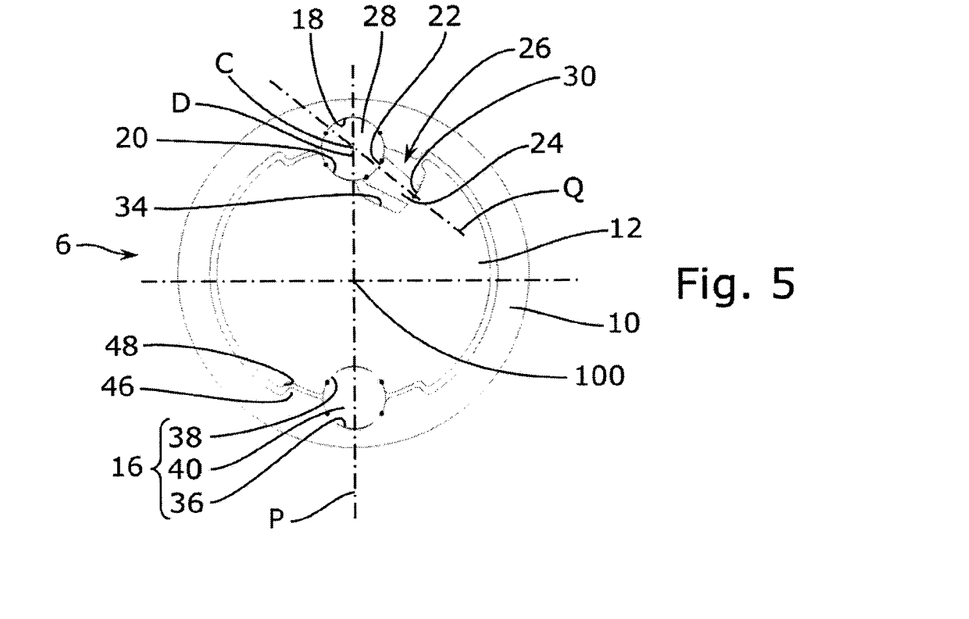
FIG. 5 is a schematic view illustrating in cross-section the points of contact between the parts of the coupling device of FIG. 1.

The oblique raceway 20 and the complementary raceway 22 are located on either side of a reference plane P which contains the reference axis 100 and the alignment axis of the C centres of the balls 28. The wrap-around raceway 18 has, in cross-section in the cutting plane of FIGS. 4 and 5 which is perpendicular to the reference axis 100, a pointed profile, symmetrical with respect to the reference plane P, and comprising two sections in an arc of a circle located on either side of the reference plane P, having a radius of curvature greater than the radius of the balls 28 of the row of balls, such that each of the balls 28 has, in the cutting plane perpendicular to the reference axis and passing through its centre, a single area of effective contact area, if any, with each of the two sections in an arc of a circle, as shown in FIG. 5. The oblique raceway 20 has, in cross-section in any plane parallel to the cutting plane of FIGS. 4 and 5, a concave profile, preferably in an arc of a circle, preferably with a radius of curvature greater than the radius of the balls 28 of the row of balls, so that there is no area of effective contact, if any, between each ball 28 and the oblique raceway 20. The additional raceway 22 has, in cross-section in any cutting plane parallel to the cutting plane of FIGS. 4 and 5, a concave pointed profile with two circular arcs of radius greater than the radius of the balls 28, so as to have two areas of effective contact separated, if necessary punctual, from each of the balls 28 in the row of balls.

The play take-up rail 24 is in contact with a contact surface 30 which forms a wall of the groove 26 of the inner shaft 12. This contact surface 30 faces the reference plane P and has, in cross-section in a cutting plane perpendicular to the reference axis 100, a concave profile, preferably in an arc of a circle, preferably with a centre of curvature D located in the reference plane P, preferably between the reference axis 100 and the alignment axis of the ball centres 28 of the row of balls. Thus, the contact surface 30 has, in cross-section in any plane parallel to the cutting plane of FIGS. 4 and 5, a profile that approaches an axis of alignment of the centres of the balls 28 away from the reference axis 100.

The play take-up rail 24 has, in cross-section in any cutting plane perpendicular to the reference axis 100, a convex contact face with the concave contact surface 30 of the inner shaft 12, and this convex face has a smaller bending radius than the bending radius of the concave contact face 30, so that, in cross-section in any cutting plane perpendicular to the reference axis 100, there is only one effective contact area, if any, between the play take-up rail 24 and the concave contact surface 30.

The play take-up ball guide 14 also has an elastic element 32, which is a wave spring blade, which loads the play take-up rail 24 in a direction of support against the row of balls 28, parallel to a transverse plane perpendicular to the reference axis. The elastic member 32 is supported against a support surface 34 of the inner shaft 12, located opposite and at a distance from a plane O, passing through the centres C of the balls of the row of balls 28 and cutting a contact area between the play take-up rail 24 and the contact surface 30 of the inner shaft 12.

The respective arrangements and orientations of the complementary raceway 22 and the contact surface 30 are such that the forces applied to the play take-up rail 24 by the balls 28 are transmitted to the contact surface 30 with only a slight load on the elastic member 32. For this purpose, the curvature of the contact surface 30, observed in a plane perpendicular to the reference axis 100, is such that at any point on the contact surface 30 the centre of curvature D is close to the alignment axis of the C centres of the balls 28, and preferably in the reference plane P, between the reference axis 100 and the alignment axis of the centres C of the balls 28, closer to the latter than to the reference axis 100.

Thus, the resultant force applied to the play take-up rail 24 by the balls 28 on the one hand and by the contact surface 30 with the inner shaft 12 on the other hand, is not zero, and is compensated by a force exerted by the elastic member 32. This resultant is an increasing function of the torque applied between the two coaxial shafts 10, 12.

For this purpose, the elastic means 32 is such that whatever the position of the play take-up rail 24, the force applied by the elastic member 32 to the play take-up rail 24 is sufficient to compensate for the resultant of the other forces on the play take-up rail 24, for the entire permissible torque range in operation, and in particular for the maximum permissible torque in operation.

In practice, the relative orientation of the contact surface 30 and the contact surface 34 are chosen in such a way that there is a high proportionality ratio, preferably greater than 10, and preferably greater than 50, between the modulus of contact force between the play take-up rail 24 and the contact surface 30 and the modulus of the resultant force between the elastic member 32 and the play take-up rail 24.

The additional ball guide 16 comprises an additional first wrap-around raceway 36 formed on the outer shaft 10, an additional second wrap-around raceway 38 formed on the inner shaft 12 and an additional row of balls 40 to run parallel to the reference axis 100 on the additional first wrap-around raceway 36 and the additional second wrap-around raceway 38, each of the additional balls 40 preferably having two separate areas of effective contact, if any punctual, with the first additional wrap-around raceway 36 and two separate areas of effective contact, if any punctual, with the second additional wrap-around raceway 38.

Axial locking washers 42, 44 are mounted at the ends of the inner shaft 12, to secure the play take-up rail 24 in translation parallel to the reference axis 100 with respect to the inner shaft 12, and to prevent the escape of balls 28, 40 from the two rows of balls.

Assembling the coupling device is particularly simple. First, the inner shaft 12 is positioned in the outer shaft 10, then the additional balls 40 of the additional row of balls 40 are inserted, then the play take-up rail 24 and the elastic member 32, which is kept in a compressed state to insert the balls 28 of the row of balls 28, before finally releasing the elastic member 32 and positioning the lock washers 42. Once assembled, the assembly is isostatic for movements in any plane perpendicular to the reference axis 100.

In the absence of torque exerted about the reference axis 100 between the two coaxial shafts 10, 12, the sum of the forces exerted on each ball 28, 40 has a null component in a plane perpendicular to the reference axis 100; the wrap-around raceway 18, the oblique raceway 20 and the complementary raceway 22 apply support forces having components in the transverse plane that are in balance to the balls 28 of the row of balls 28. The force applied by the additional raceway 22 is determined by the tension of the elastic means 32.

When a torque is applied to one of the shafts 10, 12, the distribution of contact pressures between the balls 28 and the raceways 18, 20, 22 changes to ensure transmission of the torque to the other shaft 12, 10, but the elastic means 32 ensures in all circumstances permanent contact between the balls 28 and the raceways 18, 20, 22.

A degraded operating mode is also made possible by angular stops 46 formed on the facing outer shaft and at a short distance from corresponding counterstops 48 formed on the inner shaft: if the balls 28, 40 of one of the rows of balls escape, a torque applied to one of the two shafts 10, 12, after an angular stroke corresponding to the distance between the facing stops 46 and counterstops 48, if applicable, is transmitted to the other shaft 12, 10.

Of course, many alternative solutions can be considered.

Figure 6:
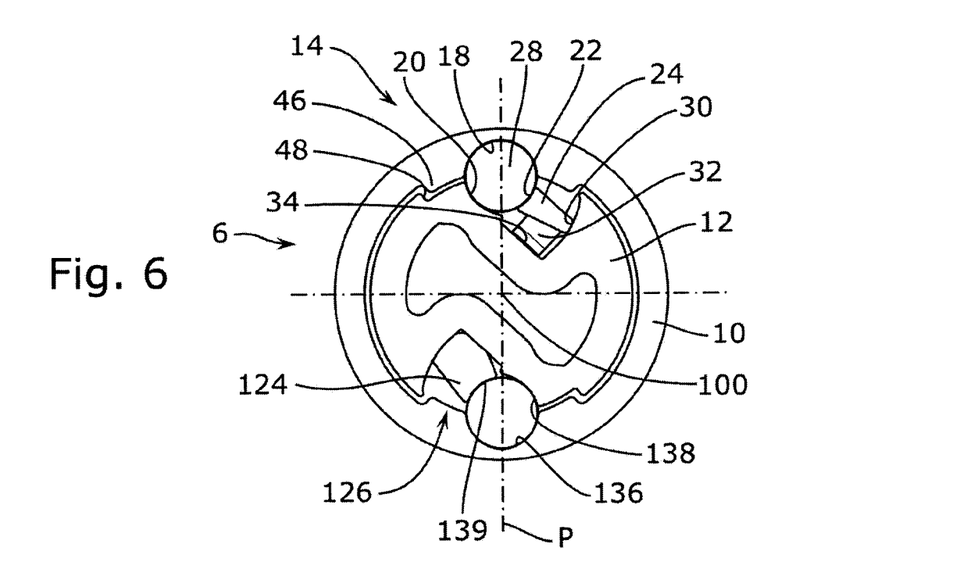
FIG. 6 is a cross-sectional view of a coupling device in a second embodiment of the invention, in a nominal operating position.

According to a second embodiment illustrated in FIG. 6, the second of the two shafts has, at the additional ball guide 16, an additional groove 126 which is symmetrical of the groove 26 with respect to the reference axis 100, so that the inner shaft 12 has overall a second order rotation symmetry about the reference axis 100. In practice, the additional ball guide 16 has a first additional raceway 136 formed on the outer shaft; a second additional raceway 138 formed on the inner shaft and a third additional raceway 139 formed on an additional rail 124, housed in the additional groove 126. The additional rail 124 has no play take-up function and is fixed in relation to the inner shaft 12. In particular, there is no additional elastic element to load the additional rail 124. The additional row of balls 40 is thus able to run parallel to the reference axis 100 on the first additional raceway 136, the second additional raceway 138 and the third additional raceway 139.

Figure 7:
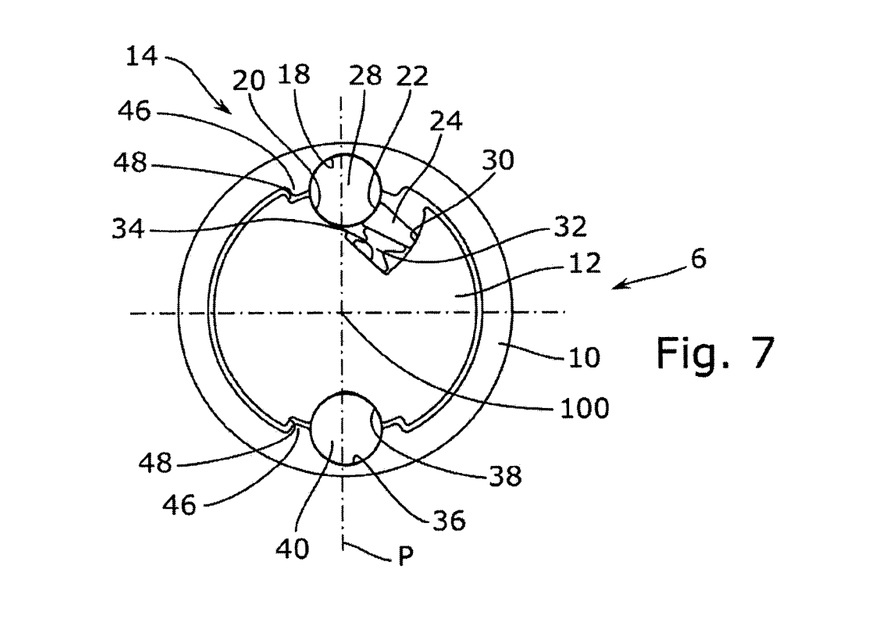
FIG. 7 is a cross-sectional view of a coupling device in a third embodiment of the invention, in a nominal operating position.

According to the embodiment of FIG. 7, the elastic member 32 consists of one or more elastomer parts, since the forces to be applied to the play take-up rail 24 are relatively low.

Figure 8:
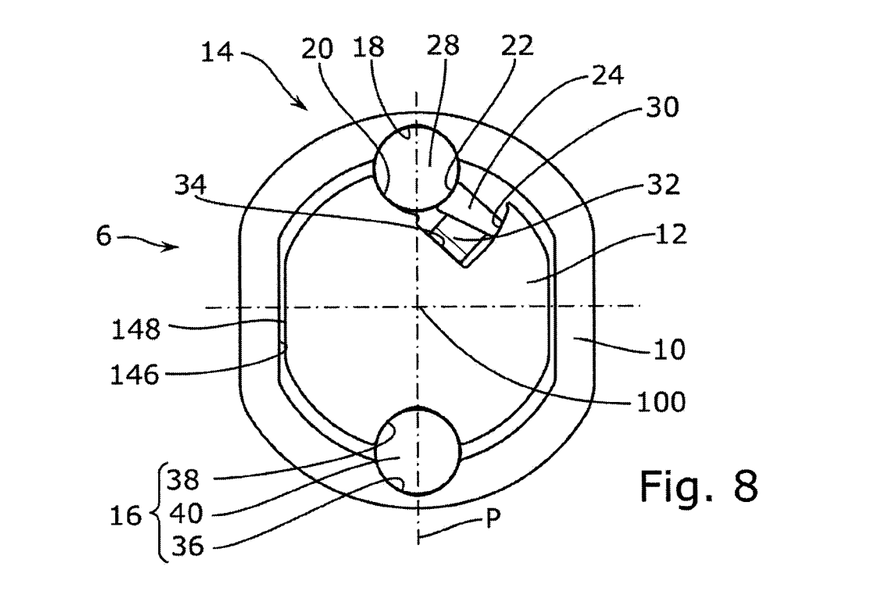
FIG. 8 is a cross-sectional view of a coupling device according to a fourth embodiment of the invention, in a nominal operating position.

According to the embodiment of FIG. 8, two straight flanks 146, 148 are provided on the outer shaft 10 and inner shaft 12, which serve as angular stops and counterstops between the two shafts 10, 12 if the balls escape.

Figure 9:
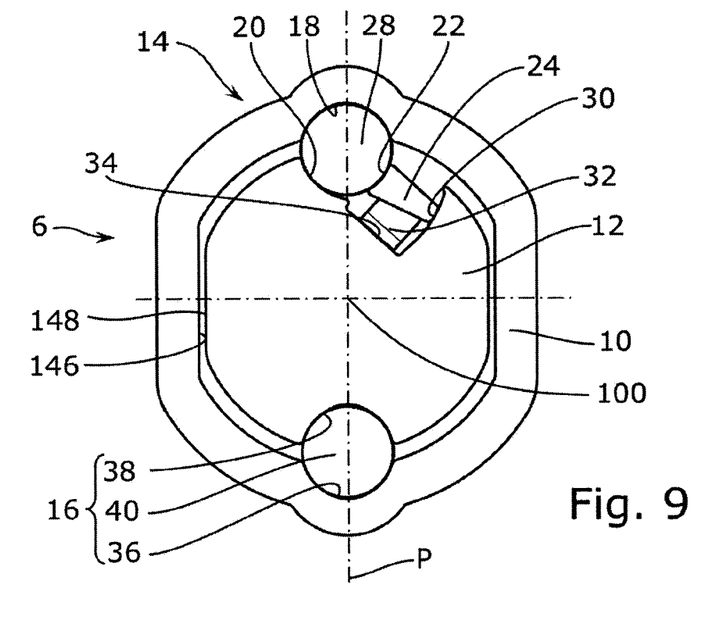
FIG. 9 is a cross-sectional view of a coupling device in a fifth embodiment of the invention, in a nominal operating position.
Figure 10:
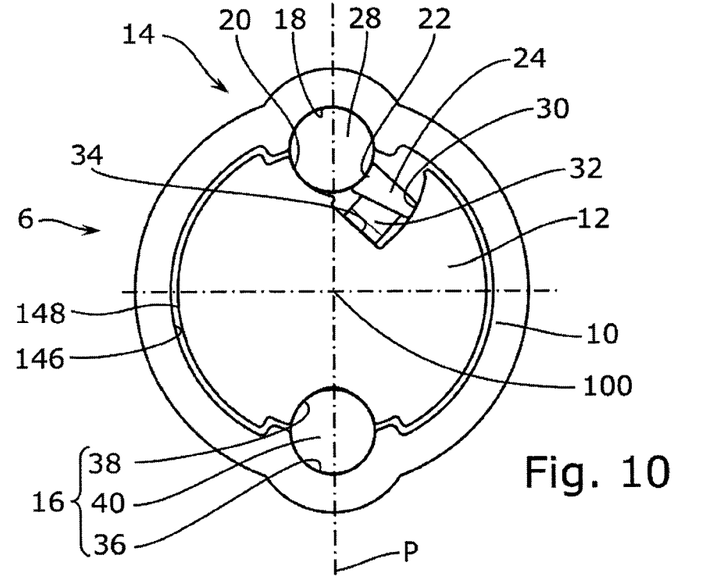
FIG. 10 is a cross-sectional view of a coupling device according to a sixth embodiment of the invention, in a nominal operating position.

According to the embodiments in FIGS. 9 and 10, the tubular outer shaft 10 can be drawn with a substantially constant thickness, particularly on the wrap-around raceways 18, 36.

Figure 11:
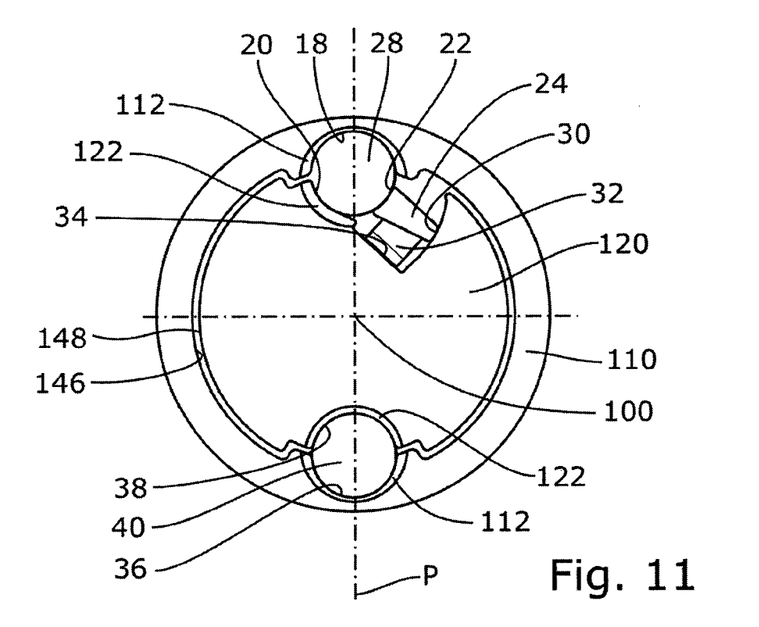
FIG. 11 is a cross-sectional view of a coupling device according to a seventh embodiment of the invention, in a nominal operating position.

According to the embodiment of FIG. 11, at least one of the inner and outer shafts 10, 12 has a body 110, 120 made of a light material, for example aluminium or a composite material, which does not have the necessary hardness to form raceways directly on it, and an insert 112, 122 on which at least one raceway 18, 20, 36, 38 is formed.

Figure 12:
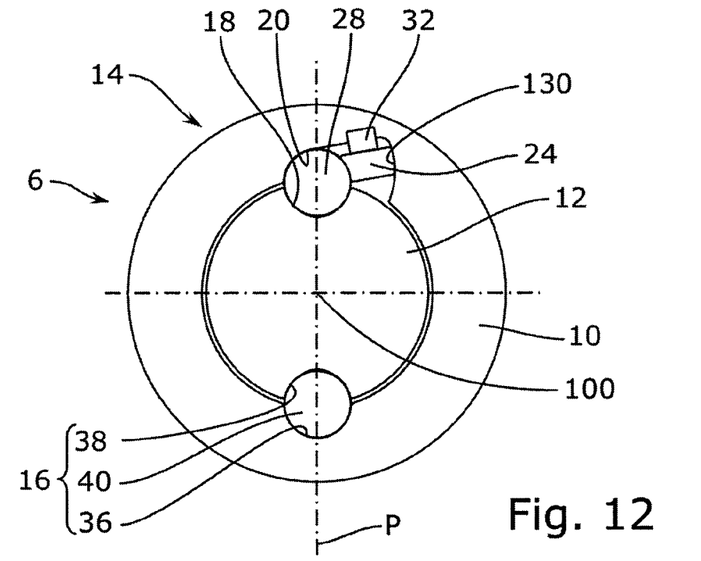
FIG. 12 is a cross-sectional view of a coupling device according to an eighth embodiment of the invention, in a nominal operating position.

According to the embodiment of FIG. 12, the play take-up rail 24 is supported against a contact surface 130 of the outer shaft 10, and the elastic member 32 is positioned between the outer shaft 10 and the play take-up rail 24. The oblique raceway 20 is then formed on the outer shaft 10 and the wrap-around ogive raceway 18 on the inner shaft 12.

Figure 13:
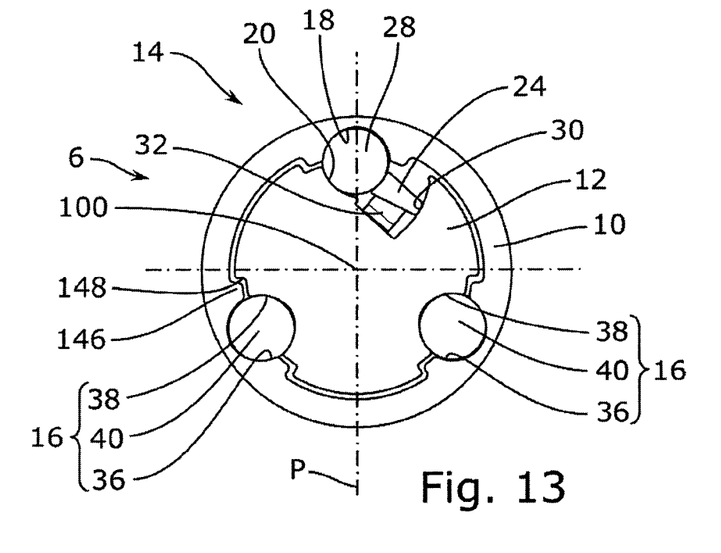
FIG. 13 is a cross-sectional view of a coupling device according to a ninth embodiment of the invention, in a nominal operating position.

According to the embodiment of FIG. 13, two additional guidance devices 16 are provided instead of a single one. The three guide devices 14, 16, 16, 16 are preferably arranged at 120° to each other. In theory, more than two additional guidance devices can be considered.

According to one embodiment not shown, one and/or the other of the axial locking washers 42, 44 can be replaced by bosses formed on the inner shaft 12 and/or the outer shaft 10.

The additional raceway 22 may have, in cross-section in any cutting plane parallel to the cutting plane of FIGS. 4 and 5, an arc of a circle with a radius greater than the radius of the balls 28, so as to have only one area of effective contact, if any, with each of the balls 28 in the row of balls.

Naturally, the examples represented on the figures and discussed above are given for illustrative purposes only and are not exhaustive. There is explicit provision for these various embodiments and alternative solutions to be combined to propose other ones.

The inner shaft 12 can be either solid or tubular.

It should be underlined that all characteristics, as they emerge for a skilled person from this description, drawings and attached claims, even if in practice they have only been described in relation to other determined characteristics, both individually and in any combinations, may be combined with other characteristics or groups of characteristics disclosed here, provided that this has not been expressly excluded or that technical circumstances make such combinations impossible or meaningless.

What is claimed is:

1. A coupling device comprising two coaxial shafts capable of rotating about a reference axis of the coupling device, the two coaxial shafts comprising a tubular outer shaft and an inner shaft, the coupling device further comprising a play take-up ball guide, comprising:
    a wrap-around raceway extending parallel to the reference axis and formed on a first of the two coaxial shafts, the wrap-around raceway being formed on either side of a reference plane of the coupling device, the reference plane containing the reference axis;
    an oblique raceway formed on a surface of a second of the two coaxial shafts and extending parallel to the reference axis;
    a row of balls, the balls of the row of balls each having a ball centre positioned along an alignment axis parallel to the reference axis and located in the reference plane; and
    for each row of balls, a single play take-up rail, the single play take-up rail being fixed in translation parallel to the reference axis with respect to the second of the two coaxial shafts and movable with respect to the second of the two coaxial shafts parallel to a plane perpendicular to the reference axis, and comprising a complementary raceway, the oblique raceway and the complementary raceway being located on said either side of the reference plane and facing towards the reference plane;
    the row of balls positioned to run parallel to the reference axis on the wrap-around raceway, the oblique raceway, and the complementary raceway, to guide the two coaxial shafts with respect to each other in translation parallel to the reference axis; and
    a portion of each ball of the row of balls being directly in contact against the oblique raceway of the second of the two coaxial.

2. The coupling device of claim 1, wherein the play take-up rail is in contact with a curved contact surface of a groove within the inner shaft.

3. The coupling device of claim 1, wherein the play take-up rail is in contact with a curved contact surface of a groove within the outer shaft.

4. The coupling device of claim 1, wherein the play take-up rail is located on only a single side of each of the balls.

5. The coupling device of claim 1, further comprising at least one elastic member loading the play take-up rail in a direction of support against the row of balls, parallel to a transverse plane perpendicular to the reference axis such that in an absence of torque exerted about the reference axis between the two coaxial shafts, the wrap-around raceway, the oblique raceway, and the complementary raceway apply support forces on the balls of the row of balls having components in the transverse plane that balance each other, and that the two coaxial shafts are fixed to each other in rotation about the reference axis.

6. The coupling device of claim 1, further comprising a single elastic member solely located on a single side of each of the balls and being supported against a support surface of a groove within one of the two coaxial shafts.

7. The coupling device of claim 1, wherein the oblique raceway has, in cross-section in a cutting plane perpendicular to the reference axis, a concave profile in an arc of a circle and having a radius of curvature greater than a radius of the balls in the row of balls.

8. The coupling device of claim 1, wherein the wrap-around raceway has, in cross-section in a cutting plane perpendicular to the reference axis, a pointed profile, comprising two sections in an arc of a circle facing the reference plane and having a radius of curvature greater than a radius of the balls of the row of balls.

9. The coupling device of the claim 1, wherein the outer shaft has a substantially constant cross-sectional thickness at the row of balls.

10. The coupling device of claim 1, wherein the complementary raceway has, in cross-section in a cutting plane perpendicular to the reference axis, a concave profile having a radius of curvature smaller than a radius of the balls in the row of balls.

11. The coupling device of claim 1, wherein the coupling device further comprises at least one additional guide, each of the additional guide comprising a first additional wrap-around raceway formed on the first of the two shafts, a second additional wrap-around raceway formed on the second of the two shafts, and a row of additional balls for rolling parallel to the reference axis on the first additional wrap-around raceway and the second additional wrap-around raceway, each of the additional balls having two separate areas of effective contact with the first additional wrap-around raceway, and two separate areas of effective contact with the second additional wrap-around raceway.

12. The coupling device of claim 1, wherein the coupling device further comprises at least one additional guide, each of the additional guide comprising a first wrap-around additional raceway formed on the first of the two shafts, a second oblique additional raceway formed on the second of the two shafts, a third additional raceway formed on an additional rail fixed with respect to the second of the two shafts, and a row of additional balls for running parallel to the reference axis on the first wrap-around additional raceway, the second oblique additional raceway, and the third additional raceway, each of the additional balls having two separate areas of effective contact with the first wrap-around additional raceway, at least one area of effective contact with the second oblique additional raceway, and at least one area of effective contact with the third additional raceway, and in that the play take-up rail is accommodated in a groove of the second of the two shafts, the groove having a given profile, the additional rail being accommodated in an additional groove of the second of the two shafts having a profile identical to that of the groove.

13. The coupling device of claim 1, wherein the coupling device comprises at least one axial stop for axially stopping the play take-up rail with respect to the second of the two shafts, the axial stop comprising at least one insert fixed to the second of the two shafts or to the play take-up rail, or at least one shoulder formed on the second of the two shafts and able to come into contact with the play take-up rail.

14. A motor vehicle steering column comprising:
a steering wheel-coupled shaft;
a steering gear-coupled shaft, an outer of the shafts surrounding a distal end of an inner of the shafts, with the inner of the shafts being linearly slidable along a reference axis relative to the outer of the shafts, and the shafts being concentric and rotatable about the reference axis;
a first curved raceway formed on a first one of the shafts, the first curved raceway extending parallel to the reference axis;
a second curved raceway formed on a second one of the shafts, the second curved raceway extending parallel to the reference axis;
a row of balls located on the first curved raceway and the second curved raceway and directly contacting against the first curved raceway and the second curved raceway; and for the row of balls, a single elongated rail being located within a groove of the first one of the shafts between:
(a) a contact surface of the first one of the shafts, and
(b) an oppositely facing single side of the row of balls.

15. The motor vehicle steering column of claim 14, wherein the groove and the internal contact surface are part of the inner of the shafts.

16. The motor vehicle steering column of claim 14, wherein the groove and the internal contact surface are part of the outer of the shafts.

17. The motor vehicle steering column of claim 14, wherein a portion of the groove which contacts the rail has a different shape and faces a different direction as compared to the first curved raceway.

18. The motor vehicle steering column of claim 14, further comprising an elastic member located between the rail and a support surface of the groove which is offset angled from but adjacent to the internal contact surface of the groove, a width of the elastic member being less than an adjacent width of the rail where the elastic member and the rail contact together, and the elastic member being only on a single side of the balls as is the rail.

19. The motor vehicle steering column of claim 14, wherein the outer of the shafts has a substantially constant cross-sectional thickness at the balls.

20. A motor vehicle steering column comprising:
a steering wheel-coupled shaft;
a steering gear-coupled shaft, an outer of the shafts surrounding a distal end of an inner of the shafts;
a first raceway integral with a first one of the shafts;
a second raceway integral with a second one of the shafts;
a ball located in the first raceway and the second raceway and directly contacting against the first raceway and the second raceway; and
an elongated play take-up rail being located within a groove of the first one of the shafts;
a portion of the groove which contacts the rail having a different shape and facing a different direction as compared to the first raceway;
an elastic member located between the rail and a support surface of the groove, the support surface being offset angled from but adjacent to the internal contact surface of the groove;
a width of the elastic member being less than an adjacent width of the rail where the elastic member and the rail contact together; and
the elastic member being located on only a single side of the ball, the rail being located on the same single side of the ball as the elastic member.

* * * * *